(12) United States Patent
Prive

(10) Patent No.: US 12,419,301 B2
(45) Date of Patent: Sep. 23, 2025

(54) ANIMAL HOIST

(71) Applicant: Michel Prive, Sherwood Park (CA)

(72) Inventor: Michel Prive, Sherwood Park (CA)

(*) Notice: Subject to any disclaimer, the term of this patent is extended or adjusted under 35 U.S.C. 154(b) by 127 days.

(21) Appl. No.: 18/538,301

(22) Filed: Dec. 13, 2023

(65) Prior Publication Data

US 2025/0194583 A1 Jun. 19, 2025

(51) Int. Cl.
*A01M 31/00* (2006.01)

(52) U.S. Cl.
CPC .................. *A01M 31/006* (2013.01)

(58) Field of Classification Search
CPC .... A01M 31/006; A01K 15/00; B60P 1/5471; B60P 1/4407
See application file for complete search history.

(56) References Cited

U.S. PATENT DOCUMENTS

| | | | | |
|---|---|---|---|---|
| 5,752,799 A * | 5/1998 | Carey | ................... | B60P 1/5471 224/403 |
| 6,638,001 B1 * | 10/2003 | McKinley | ............. | B60P 1/4407 224/447 |
| 6,769,858 B1 * | 8/2004 | Butler | ....................... | B60R 9/06 414/500 |
| 7,302,765 B1 * | 12/2007 | Jorgenson | ............... | E02F 3/627 37/231 |
| 9,055,738 B1 * | 6/2015 | Woller | ................ | A01M 31/006 |
| 10,384,617 B1 * | 8/2019 | Keyser | ...................... | B60R 9/06 |
| 2002/0168257 A1 * | 11/2002 | Smith | .................. | B60P 1/4407 414/546 |
| 2006/0120841 A1 * | 6/2006 | Meeks | .................. | B60P 1/4407 414/462 |
| 2006/0182571 A1 * | 8/2006 | Hightower | ............. | A01K 15/00 414/466 |
| 2008/0292435 A1 * | 11/2008 | Turner | .................. | B60P 1/4407 414/462 |
| 2014/0271068 A1 * | 9/2014 | Baumann | ............. | B60P 1/4407 414/469 |

* cited by examiner

*Primary Examiner* — Derek J Battisti
(74) *Attorney, Agent, or Firm* — Orin Del Vecchio

(57) ABSTRACT

A large animal hoist that is configured to be operably coupled to a utility terrain vehicle wherein the present invention facilitates the lifting and transport of a large animal. The present invention includes a frame wherein the frame includes a receiving platform. The receiving platform is slidably coupled to connection members of the frame and includes longitudinal and lateral support members arranged in a configuration to have an animal superposed thereon. A vertical barrier member is operably coupled to the frame inhibiting movement of an animal therepast. A winch assembly is secured to the frame and is operably coupled to a hitch receiver of the utility terrain vehicle. The winch assembly includes a winch and horizontal support members coupled with vertical post members. Lifting members operably couple the winch assembly to the frame wherein a drive cable and pulleys facilitate the movement thereof.

11 Claims, 4 Drawing Sheets

ANIMAL HOIST

FIELD OF THE INVENTION

The present invention relates generally to hunting accessories, more specifically but not by way of limitation, a large animal hoist wherein the hoist of the present invention is configured to be operably coupled to a utility terrain vehicle and assist in the lifting and transportation of large animals after a hunt.

BACKGROUND

Wild game hunting is a popular sport that millions of individuals participate in on an annual basis. There are many targeted species for hunters which can include but are not limited to wild boar, deer, elk and moose. Depending on the type of hunting, many hunters must traverse great lengths in order to find a location where they may have a successful hunt. Hunters will hike many miles to set up at a location in order to successfully target an animal such as but not limited to an elk.

One challenge that many hunters face is the transport of a large animal such as but not limited to an elk after a successful hunt. Animals such as elk can weigh well over five hundred pounds and present a challenge to lift and transport the animal back to a location for dressing. While some hunters will field dress a kill, the saved remains can still weigh hundreds of pounds and most often cannot be lifted and transported by a single individual.

Accordingly, there is a need for a large animal hoist that is configured to operably coupled to a utility terrain vehicle and is operable to receive a large animal thereon for lifting and transport thereof.

SUMMARY OF THE INVENTION

It is the object of the present invention to provide a large animal hoist that is configured to assist in the lifting and transportation of a large animal after a successful hunt wherein the present invention includes a frame manufactured from a durable rigid material such as but not limited to metal.

Another object of the present invention is to provide an animal hoist that is configured to be operably coupled to a utility terrain vehicle wherein the frame of the present invention includes a receiving platform.

A further object of the present invention is to provide a large animal hoist that is configured to assist in the lifting and transportation of a large animal after a successful hunt wherein the receiving platform is slidably coupled to a support portion of the frame.

Yet a further object of the present invention is to provide an animal hoist that is configured to be operably coupled to a utility terrain vehicle wherein the frame includes a vertical member extending upward from the support portion of the frame.

Still another object of the present invention is to provide a large animal hoist that is configured to assist in the lifting and transportation of a large animal after a successful hunt wherein the frame includes lifting members movably coupled thereto.

An additional object of the present invention is to provide an animal hoist that is configured to be operably coupled to a utility terrain vehicle wherein the frame further includes a plurality of pulleys and a cable operably coupled thereto.

Yet a further object of the present invention is to provide a large animal hoist that is configured to assist in the lifting and transportation of a large animal after a successful hunt wherein the frame further includes a vertical support member extending upward from the winch support member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
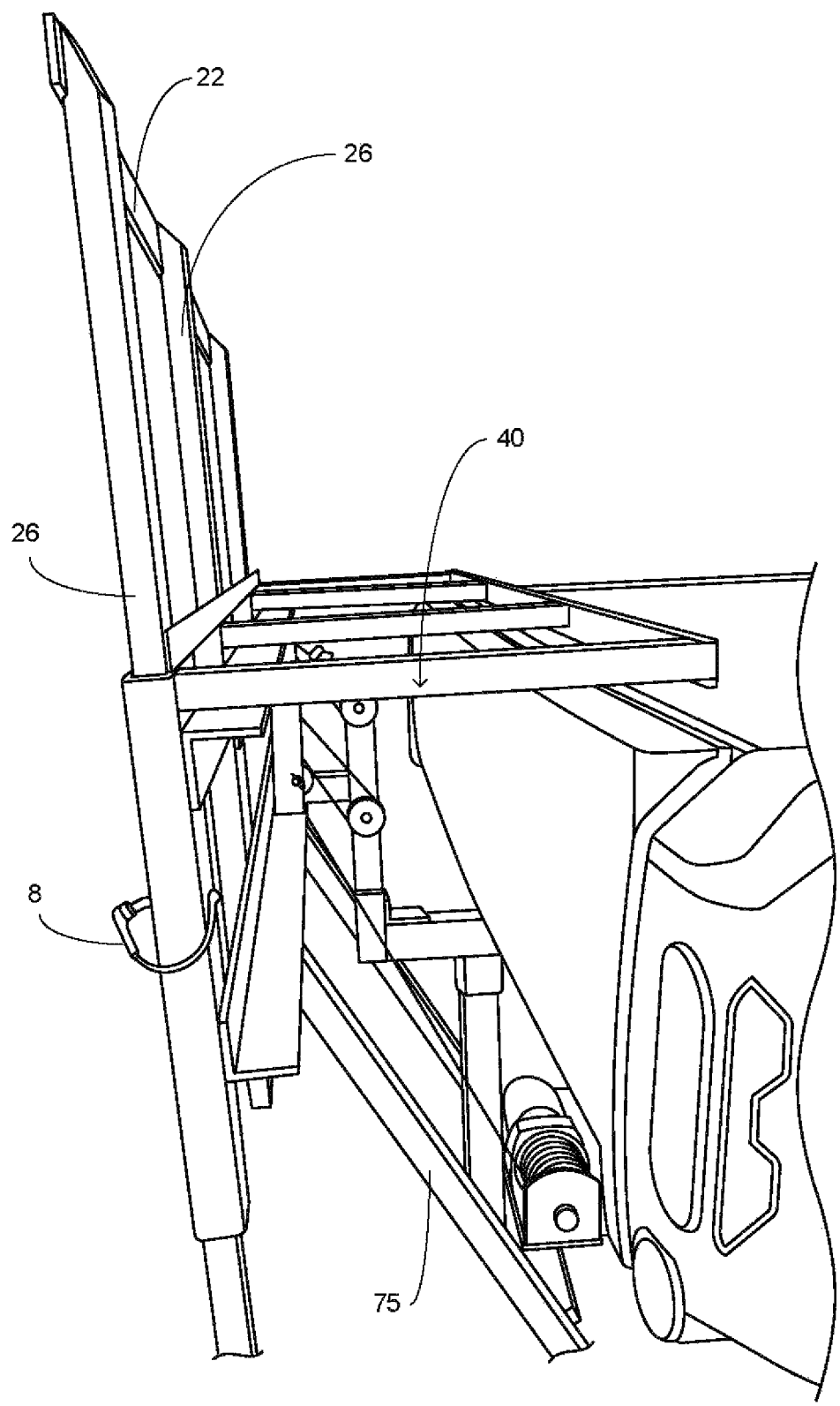
FIG. 1 is a side view of the present invention in a retracted position.
Figure 2:
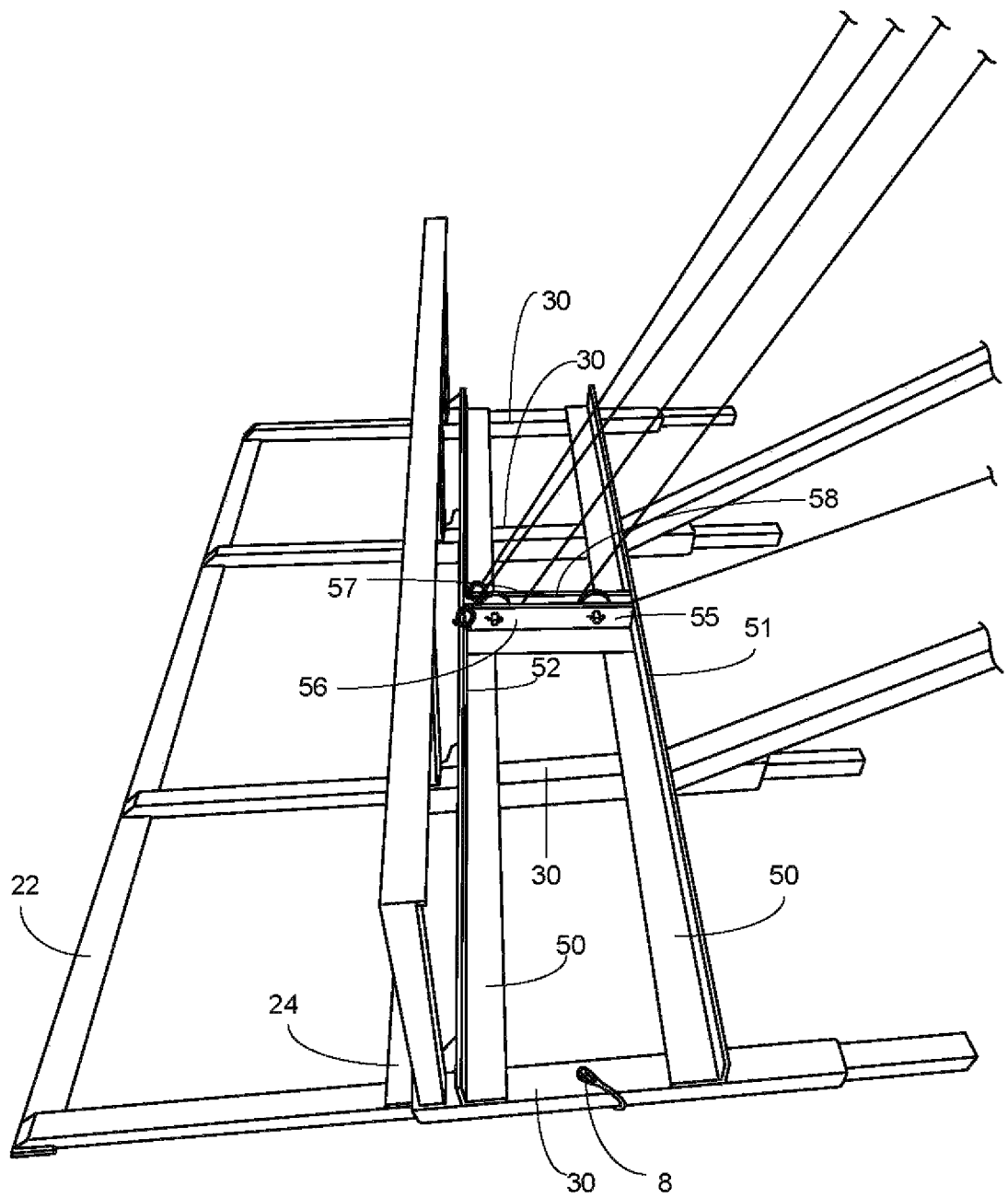
FIG. 2 is a top view of the present invention in a deployed position.
Figure 3:
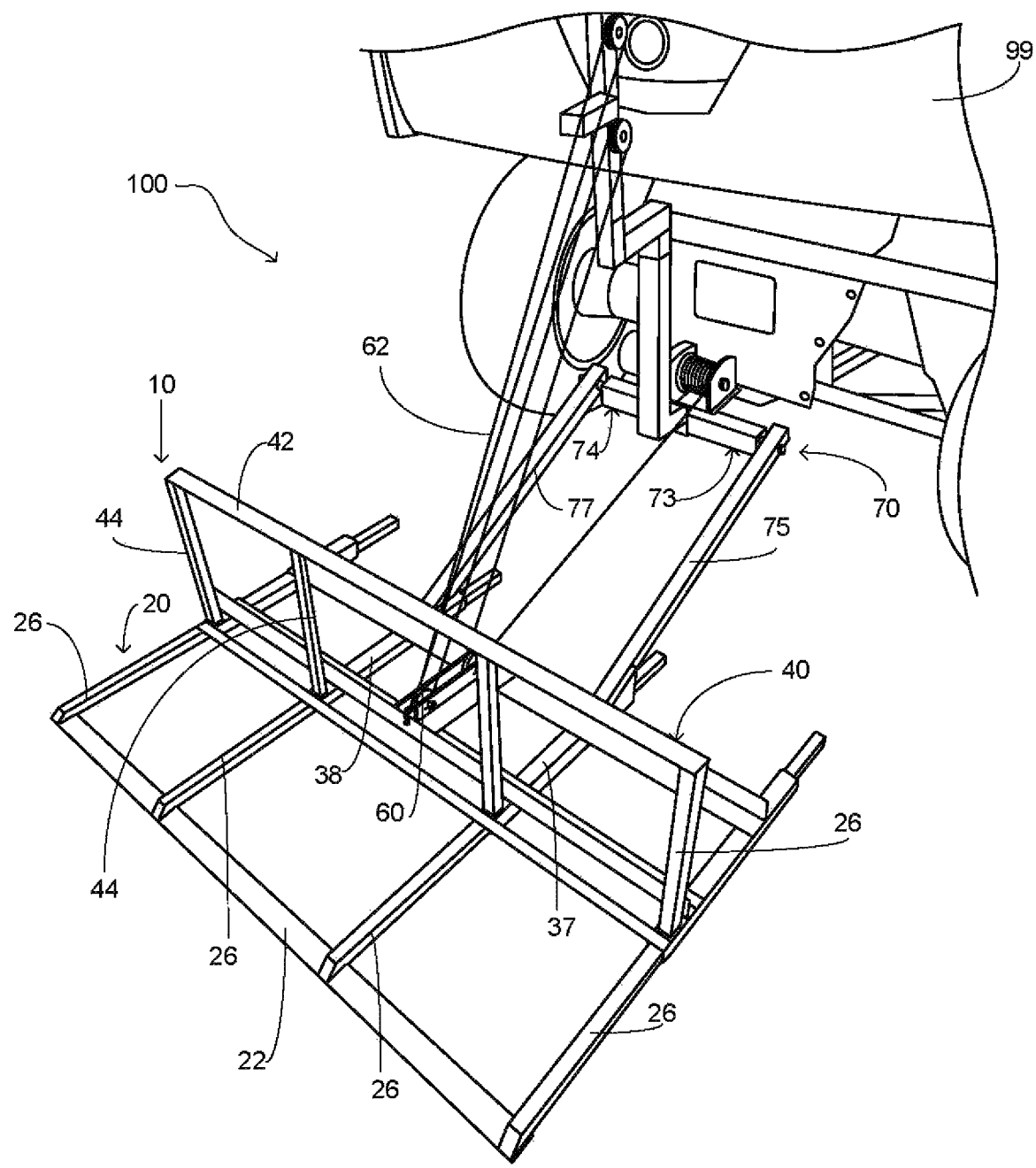
FIG. 3 is a top perspective view of the present invention in a deployed position coupled to an exemplary utility terrain vehicle.
Figure 4:
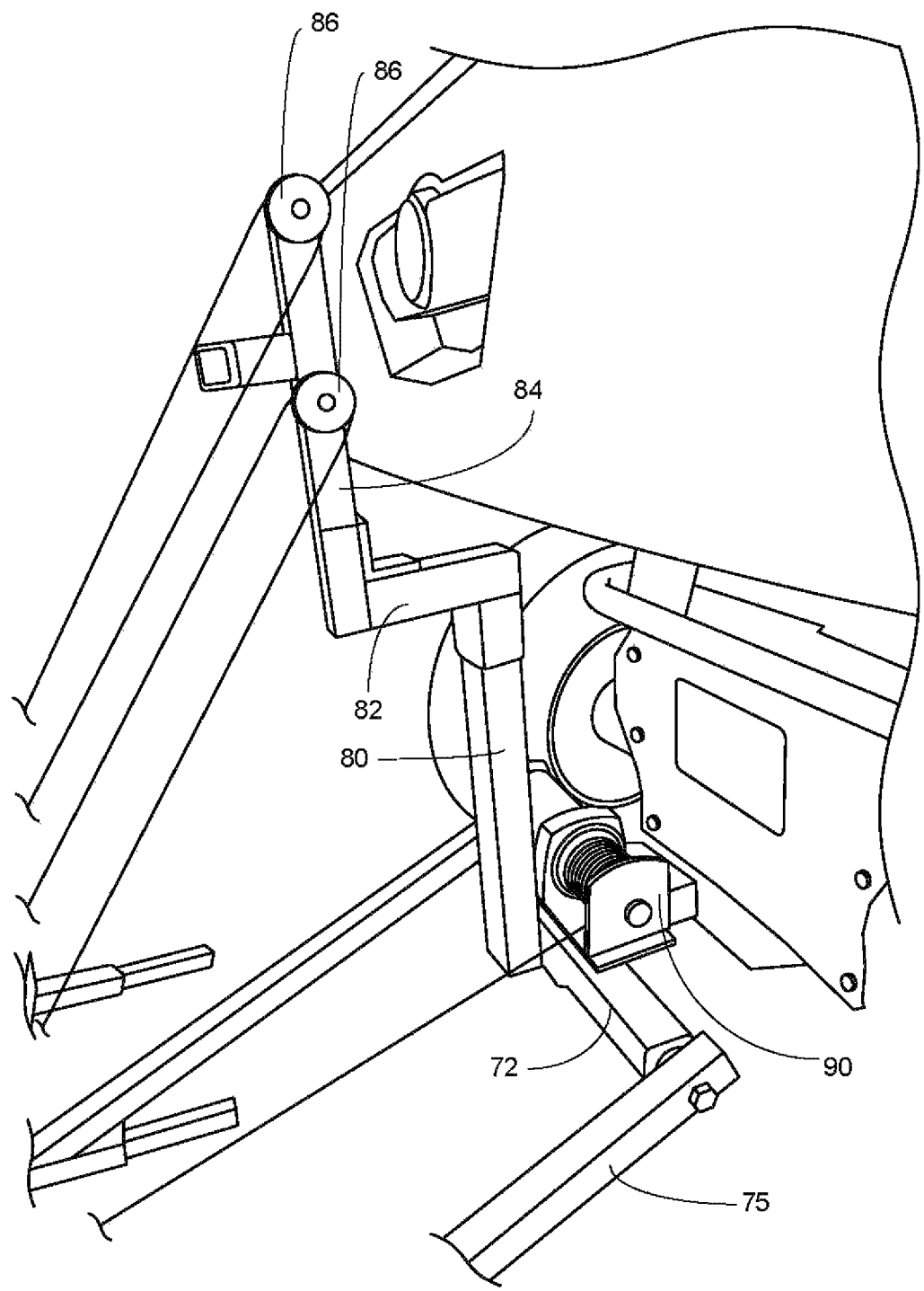
FIG. 4 is a detailed view of the winch assembly of the present invention.

Referring now to the drawings submitted herewith, wherein various elements depicted therein are not necessarily drawn to scale and wherein through the views and figures like elements are referenced with identical reference numerals, there is illustrated an animal hoist 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the animal hoist 100 includes a frame 10 wherein the frame 10 is manufactured from a durable material such as but not limited to metal. It should be understood within the scope of the present invention that the frame 10 could be provided in alternate sizes and shapes than that illustrated and discussed herein.

The frame 10 includes a receiving platform 20. The receiving platform 20 is configured to have a large animal superposed thereon for lifting thereof. The receiving platform 20 includes a first lateral support member 22 and a second lateral support member 24 that are parallel in configuration. Four longitudinal support members 26 are operably coupled to the first lateral support member 22 being perpendicular therewith. The four longitudinal support members 26 are equivalently spaced across the width of the receiving platform 20. The longitudinal support members 26 are slidably coupled with connection members 30. The connection members 30 are manufactured from square metal tubing having openings at each end thereof facilitating an ability to slidably move the longitudinal support members therethrough. The slidable movement of the longitudinal support members 26 provides an ability to alter the size of the receiving platform 20 in order to accommodate alternate size animals being placed thereon. While four longitudinal support members 26 are illustrated herein, it is contemplated within the scope of the present invention that the animal hoist 100 could employ more or less than four longitudinal support members 26. Pin 8 is present in a connection member 30 and is utilized to secure the receiving platform 20 in a desired position so as to provide sufficient area for placing an animal thereon. It is contemplated within the scope of the present invention that the receiving platform could be locked into a desired position utilizing alternate elements in addition to and/or in conjunction with the pin 8.

A vertical barrier member 40 is operably coupled to the frame 10 proximate the first ends of the connection members 30 and extends across the width of the frame 10. The vertical barrier member 40 is comprised of an upper lateral member 42 superposed the upper ends of four vertical support members 44. The vertical barrier member 40 functions to inhibit an animal superposed on the receiving platform therepast in direction towards the exemplary utility terrain vehicle 99. It should be understood within the scope of the present invention that the vertical barrier member 40 could be formed in alternate heights and employ alternate support members in addition to and/or in conjunction with the elements illustrated and described herein.

The frame 10 further includes lifting support members 50 that are located rearward of the vertical barrier member 40. The lifting support members 50 are secured to the upper surfaces of the connection members 30 extending across the full width of the frame 10. The lifting support members 50 are parallel in orientation and are manufactured from l-shaped metal. Utilizing l-shaped metal provides opposing vertical wall portions 51,52 that facilitate the mounting and securing of the pulley support member 55. The pulley support member 55 is intermediate the lifting support members 50 being perpendicular thereto and is secured utilizing suitable techniques such as but not limited to welding. The pulley support member 55 includes a first wall member 56 and a second wall member 57 having a void 58 therebetween. The void 58 is sufficient in width to house pulley members 60 which are rotatably mounted and operably coupled to cable 62. Cable 62 is operably coupled to winch 90 wherein the winch 90 is employed to move the frame 10 between a stored position and a deployed position.

The animal hoist 100 further includes a winch assembly 70 wherein the winch assembly 70 is configured to operably coupled to the exemplary utility terrain vehicle 99 and provide the operational movement of the frame 10. The winch assembly includes a horizontal support member 72 having a first end 73 and second end 74. The horizontal support member 72 is manufactured from a suitable material such as but not limited to square metal tubing. The horizontal support member 72 has operably coupled thereto a first lifting member 75 and a second lifting member 77. The first lifting member 75 and second lifting member 77 are movably coupled to the first end 73 and second end 74 of the horizontal support member 72. The opposing ends of the first lifting member 75 and second lifting member 77 are operably coupled to the frame 10 proximate the two center connection members 37,38. The first lifting member 75 and second lifting member 77 are manufactured from suitable materials such as but not limited to square metal tubing. The first lifting member 75 and second lifting member 77 rotate on the first end 73 and second end 74 during deployment and retrieval of the frame 10.

Secured to the horizontal support member 72 is the first vertical support post 80. The first vertical support post 80 extends upward from the horizontal support member 72 and has operably coupled thereto distal to the horizontal support member 72 an upper horizontal support member 82. The upper horizontal support member 82 is perpendicular to the first vertical support post 80 extending away from the exemplary utility terrain vehicle 99. The upper horizontal support member 82 provides positioning of the second vertical support post 84 required to ensure clearance thereof when the animal hoist 100 is operably coupled to the exemplary utility terrain vehicle 99. Upper pulley members 86 are operably coupled to the second vertical support post 84 and are positioned for operational leverage having cable 62 operably coupled thereto facilitating movement of the frame 10 with operation of the winch 90.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An animal hoist that is configured to be operably coupled to a utility terrain vehicle being operable to lift and transport a large animal wherein the animal hoist comprises: a frame, said frame having a receiving platform, said receiving platform including a first lateral support member and a second lateral support member, said first lateral support member and said second lateral support member being parallel in orientation having a void therebetween, said receiving platform further including four longitudinal support members, said four longitudinal support members being perpendicular to said first lateral support member and said second lateral support member, said four longitudinal support members being slidably coupled to four connection members, said four connection members being integrally formed with the frame, said four connection members being formed from square metal tubing, said frame further including a vertical barrier member, said vertical barrier member being perpendicular to said frame extending upward therefrom, said frame further including a first lifting support member and a second lifting support member, said first lifting support member and said second lifting support member being adjacent said vertical barrier member opposite said receiving platform, said first lifting support member and said second lifting support member being parallel in orientation having a void therebetween;

a pulley support member, said pulley support member being mounted within said void intermediate said first lifting support member and said second lifting support member, said pulley support member having a first wall and a second wall, said first wall and said second wall of said pulley support member having a void therebetween, said void intermediate said first wall and said second wall of said pulley support member having a first pulley and a second pulley mounted therein, wherein said first pulley and said second pulley have a drive cable operably coupled thereto; a winch assembly, said winch assembly operably coupled to said frame, said winch assembly operable to provide operational control and movement of said frame; and wherein said winch assembly further including a horizontal support member, said horizontal support member having a first end and a second end, said horizontal support member having a winch superposed thereon.

2. The animal hoist configured to be operably coupled to a utility terrain vehicle as recited in claim 1, wherein said winch assembly further includes a first lifting member and a second lifting member, said first lifting member being movably coupled to said first end of said horizontal support member, said second lifting member being movably coupled to said second end of said horizontal support member.

3. The animal hoist configured to be operably coupled to a utility terrain vehicle as recited in claim 2, wherein said first lifting member is elongated in form having a first end and a second end.

4. The animal hoist configured to be operably coupled to a utility terrain vehicle as recited in claim 3, wherein said second lifting member is elongated in form having a first end and a second end.

5. The animal hoist configured to be operably coupled to a utility terrain vehicle as recited in claim 4, wherein said second end of said first lifting member is operably coupled to one of said connection members of said frame.

6. The animal hoist configured to be operably coupled to a utility terrain vehicle as recited in claim 5, wherein said second end of said second lifting member is operably coupled to one of said connection members of said frame.

7. The animal hoist configured to be operably coupled to a utility terrain vehicle as recited in claim 6, wherein said winch assembly further includes a first vertical post member, said first vertical post member being coupled to said horizontal support member extending upward therefrom.

8. The animal hoist configured to be operably coupled to a utility terrain vehicle as recited in claim 7, wherein said winch assembly further includes an upper horizontal support member, said upper horizontal support member being coupled to said first vertical post member distal to said horizontal support member.

9. The animal hoist configured to be operably coupled to a utility terrain vehicle as recited in claim 8, and further including a second vertical post member, said second vertical post member being coupled to said upper horizontal support member, said second vertical post member extending upward from said upper horizontal support member.

10. The animal hoist configured to be operably coupled to a utility terrain vehicle as recited in claim 9, and further including a first upper pulley and a second upper pulley, said first upper pulley and said second upper pulley being operably coupled to said second vertical post member, said first upper pulley and said second upper pulley being operably coupled to said drive cable.

11. The animal hoist configured to be operably coupled to a utility terrain vehicle as recited in claim 10, wherein said first lifting support member and said second lifting support include vertical wall portions, said vertical wall portions having said pulley support member mounted therebetween.

* * * * *